United States Patent
Zhang et al.

(10) Patent No.: US 10,237,344 B2
(45) Date of Patent: Mar. 19, 2019

(54) COPY/PASTE FILES BETWEEN REMOTE AGENT AND LOCAL MACHINE IN HTML5 VIEW DESKTOP

(71) Applicant: VMware, Inc., Palo Alto, CA (US)

(72) Inventors: Hua Fiona Zhang, Beijing (CN); Kun Shi, Beijing (CN); Songli Li, Beijing (CN); Bomin Nie, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 252 days.

(21) Appl. No.: 15/166,051

(22) Filed: May 26, 2016

(65) Prior Publication Data

US 2017/0346894 A1    Nov. 30, 2017

(51) Int. Cl.
    *G06F 15/16*    (2006.01)
    *H04L 29/08*    (2006.01)
    *H04L 12/24*    (2006.01)

(52) U.S. Cl.
    CPC .......... *H04L 67/1095* (2013.01); *H04L 41/22* (2013.01); *H04L 67/02* (2013.01); *H04L 67/06* (2013.01)

(58) Field of Classification Search
    CPC ..... H04L 67/1095; H04L 41/22; H04L 67/02; H04L 67/06
    USPC ........................................................ 709/219
    See application file for complete search history.

(56) References Cited

U.S. PATENT DOCUMENTS

| | | | | |
|---|---|---|---|---|
| 2013/0290857 | A1* | 10/2013 | Beveridge | G06F 3/0484 715/740 |
| 2014/0108471 | A1* | 4/2014 | Liu | G06F 17/30115 707/823 |
| 2017/0070456 | A1* | 3/2017 | Norhammar | H04N 21/234336 |
| 2017/0374179 | A1* | 12/2017 | Das | H04L 67/08 |

* cited by examiner

*Primary Examiner* — Oscar A Louie
*Assistant Examiner* — Oluwatosin M Gidado
(74) *Attorney, Agent, or Firm* — Patterson & Sheridan, LLP

(57) ABSTRACT

A method includes transmitting, from a virtual desktop client operating in a hypertext markup language (HTML) based browser application running on a client device to a remote virtual desktop agent on a server, a command to copy a file. In response to receiving the command to the copy the file, receiving, at the client device, a path from the remote virtual desktop agent, where the path is used to identify a location of the file to a web server. The method includes receiving, at the client device, a command from a user to paste the file. In response to this command, the method includes transmitting, from the virtual desktop client on the browser application on the client device, a hypertext transfer protocol (HTTP) command to the web server to retrieve the file. The method also includes receiving, at the client device, the file from the web server.

22 Claims, 4 Drawing Sheets

COPY/PASTE FILES BETWEEN REMOTE AGENT AND LOCAL MACHINE IN HTML5 VIEW DESKTOP

BACKGROUND

In virtual desktop infrastructures (VDIs), virtual desktop operating systems and applications, hosted on virtual machines (VMs) running on centralized servers, are delivered as managed services to end users via a network. Such centralized and automated management of the virtualized operating system, applications, and user data provides increased control and cost savings.

Some VDIs provide a feature whereby users can connect to virtual desktops without having to install any software on a client system. In one solution, a hypertext markup language (HTML), such as HTML5, is used to provide a view client for a user. The user enters a uniform resource locator (URL) of a remote connection and logs in to connect to a remote desktop or to remote applications. One such product is Horizon® View HTML Access by VMware, Inc.

In some HTML view client solutions, there is no easy way to synchronize files between the remote agent (or remote virtual desktop agent) and the local machine. Users can often copy and paste plain text transmitted from the remote agent to the local machine and displayed on a browser running on the local machine, but cannot transfer files. A user may want to edit a file in the virtual environment and then sync the edited file to the local machine or save a copy of the edited file to the local machine but often a limitation in bandwidth makes it inconvenient for transferring files between the remote agent and the local machine. Transferring files between the remote agent and the local machine is restricted in some HTML clients so that large file transfers do not interfere with transmission of other data, such as screen, keyboard, or mouse data.

SUMMARY

One embodiment provides a computer-implemented method of transferring a file in a virtualized computing environment. The method includes transmitting, from a virtual desktop client operating in a hypertext markup language (HTML) based browser application running on a client device to a remote virtual desktop agent on a server, a command to copy a file. In response to receiving the command to copy the file, the method also includes receiving, at the client device, a path from the remote virtual desktop agent, where the path is used to identify a location of the file to a web server. The method also includes receiving, at the client device, a command from a user to paste the file. The method further includes, in response to the command from the user to paste the file, transmitting, from the virtual desktop client on the browser application on the client device, a hypertext transfer protocol (HTTP) command to the web server to retrieve the file. The method also includes, in response to the HTTP command to retrieve the file, receiving, at the client device, the file from the web server.

Another method includes receiving, at a remote virtual desktop agent on a server, a command from a virtual desktop client operating in a hypertext markup language (HTML) based browser application running on a client device to copy a file stored at the remote agent. The method also includes, in response to receiving the command to copy the file, transmitting a path used to identify the location of the file to a web server from the remote virtual desktop agent to the client device. The method further includes receiving an HTTP command at the remote virtual desktop agent from the client device, wherein the HTTP command is a command to paste the file. The method further includes, in response to receiving the HTTP command to paste the file, transmitting the file along the path from the web server to the client device.

Further embodiments of the present invention include a non-transitory computer-readable storage medium storing instructions that when executed by a computer system cause the computer system to transmit, from a virtual desktop client operating in a hypertext markup language (HTML) based browser application running on a client device to a remote virtual desktop agent on a server, a command to copy a file. The instructions also cause the computer system to, in response to receiving the command to copy the file, receive, at the client device, a path from the remote virtual desktop agent, where the path is used to identify a location of the file to a web server. The instructions also cause the computer system to receive, at the client device, a command from a user to paste the file. In response to the command from the user to paste the file, the instructions also cause the computer system to transmit, from the virtual desktop client on the browser application on the client device, an HTTP command to the web server to retrieve the file. In response to the HTTP command to retrieve the file, the instructions also cause the computer system to receive, at the client device, the file from the web server.

Further embodiments of the present invention include a non-transitory computer-readable storage medium storing instructions that when executed by a computer system cause the computer system to receive, at a remote virtual desktop agent on a server, a command from a virtual desktop client operating in a hypertext markup language (HTML) based browser application running on a client device to copy a file stored at the remote agent. The instructions also cause the computer system to, in response to receiving the command to copy the file, transmit a path used to identify the location of the file to a web server from the remote virtual desktop agent to the client device. The instructions also cause the computer system to receive an HTTP command at the remote virtual desktop agent from the client device, wherein the HTTP command is a command to paste the file. In response to receiving the HTTP command to retrieve the file, the instructions further cause the computer system to transmit the file along the path from the web server to the client device.

DETAILED DESCRIPTION

This disclosure presents techniques allowing for a user to copy and paste files between a VDI client and a remote agent in a browser-based solution. In one embodiment, a user connects to a remote desktop or to remote applications via an HTML-based client. In existing HTML-based clients, there is no way to transfer files between the client and the remote agent. A limited bandwidth channel is used to transfer data, but is too small for file transfer. Embodiments described herein employ an HTTP GET command to transfer files from the remote agent to the VDI client, and employ an HTTP POST command to transfer files from the VDI client to the remote agent. In some embodiments, a user can drag and drop files onto a panel displayed in a graphical user interface of the browser-based application. Files dropped onto the panel can be transferred between the VDI client and the remote agent. Additionally, multiple files can be downloaded or uploaded at once.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
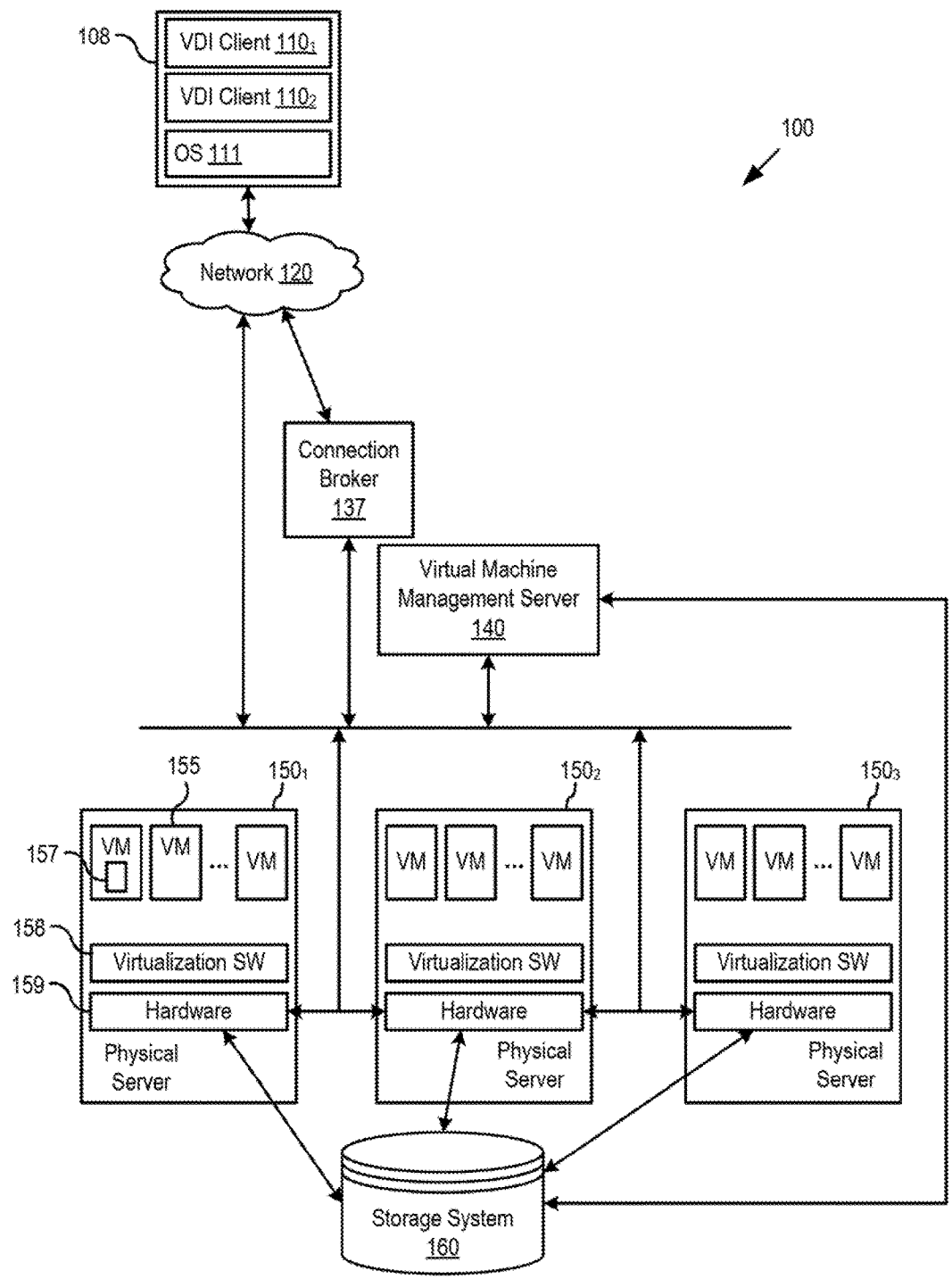
FIG. 1 illustrates components of a VDI system in which one or more embodiments of the present invention may be implemented.

FIG. 1 illustrates components of a VDI system 100 in which one or more embodiments of the present invention may be implemented. In VDI system 100, VDI client software programs (also referred to as "VDI clients" for short), e.g., VDI clients $110_{1-2}$, run on operating systems of local computing devices, e.g., client machine 108 on top of an operating system (OS) 111. In embodiments described herein, VDI clients 110 are HTML-based view clients. Users can log into VDI clients 110 through a web browser and access remote desktops or remote applications. VDI clients 110 provide an interface for the users to access their desktops, which may be running in one of virtual machines 155 or blade server (not shown) in a data center that is remote from the user locations. With VDI clients, users can access desktops running in a remote data center through network 120, from any location, using a general purpose computer running a commodity operating system and an HTML-based VDI client program such as VMware Horizon® View HTML Access.

VDI system 100 includes a connection broker 137 that manages connections between VDI clients and desktops running in virtual machines 155 or other platforms. In the embodiments of the present invention illustrated herein, desktops are running in remote agents such as virtual machines (or virtual desktops) 155 which are instantiated on a plurality of physical computers 150, each of which includes virtualization software 158 and hardware 159 (CPU(s), memory, storage, etc.), is controlled by a virtual machine management server 140, and is coupled to a shared persistent storage system 160.

HTML Access, or other browser-based view clients, allows users to connect to virtual desktops 155 without having to install any software on a client system. Users can access virtual desktops 155 or remote applications from a browser on any device, such as a laptop, thin client device, desktop personal computer, tablet, or phone. An administrator can set certain rules or policies for users, such as which users can upload and/or download files in accordance with embodiments disclosed herein.

In operation, embodiments disclosed herein allow a user to easily and seamlessly transfer files to and from virtual machines 155 via a remote agent 157 running on virtual machine 155. In a first example depicted herein, a user wants to copy a file from shared storage 160 associated with a virtual machine 155 to the local client device 110. The user can use a common keyboard command to copy a file, such as Control-C, or files can be dragged and dropped (discussed in further detail below). If the user presses Control-C to copy a file, that command is transmitted from the VDI client 110 to the remote agent 157. Upon receiving the command to copy a file, the remote agent 157 transmits the path of the file to the VDI client 110. In one embodiment, when the remote agent receives the copy command, the file is first copied to a directory (e.g., temporary directory) under the web server container, which is hosted on the remote agent 157 in certain embodiments. This path of the file in the directory can then be transmitted to the VDI client 110 via a virtual channel. The virtual channel is used to transfer data between VDI client 110 and virtual machine 155, but in some cases has bandwidth that is too limited to use for transferring files, especially particularly large files. In another embodiment, the file can be retrieved directly from the file directory without being first copied to a directory.

Next, if the user wants to paste the copied file to the VDI client 110, the user will enter an appropriate command such as Control-V. This command instructs the VDI client 110 that the user wants to retrieve the file. The file is then retrieved by sending the HTTP GET command from the web browser to the web server. The GET command retrieves the file and transmits the file from storage system 160 to VDI client 110 via HTTP. The download path is the path that was previously sent on the virtual channel. The file can be retrieved directly from the file directory at the shared storage 160. VDI client 110 can then store the file in storage local to VDI client 110. The user now has a local copy of the file on VDI client 110. HTTP commands therefore facilitate file transfers that are not available in an HTML-based view client that restricts file transfers.

The HTTP GET command is a defined method in HTTP that requests a representation of the specified resource. In general, requests using GET retrieve data and have no other effect. The HTTP GET method is used by the VDI client operating in the web browser to download the file from the web server using HTTP rather than downloading the file over a virtual channel directly from the remote agent. Therefore, the web server is effectively used as an intermediary to transfer the file between the VDI client and the remote agent.

In a second example, a user wants to copy a file from VDI client 110 to virtual machine 155. The user can use a common keyboard command to copy a file, such as Control-C, or files can be dragged and dropped (discussed in further detail below). If the user selects a file local to VDI client 110 and presses Control-C to copy the file, that command is transmitted from VDI client 110 to the remote agent 157. Then, a path associated with the file is transmitted from VDI client 110 to remote agent 157. This path can be transmitted to remote agent 157 via a virtual channel. As noted above, the virtual channel can transfer data between VDI client 110 and virtual machine 155, but generally has bandwidth that is too limited to use for transferring files.

Next, if the user wants to paste the copied file to virtual machine 155, the user will enter an appropriate command such as Control-V. This command instructs the VDI client 110 that the user wants to paste the file to virtual machine 155. The file is then retrieved using the HTTP POST command. The POST command retrieves the file from VDI client 110 and transmits the file to remote agent 157, where the file is then stored in storage system 160. The download path is the path that was previously sent on the virtual channel. The file can be retrieved directly from the file directory at VDI client 110.

The HTTP POST command requests that the receiver, such as remote agent 157, accept the entity (i.e., the file to be copied) enclosed in the request. As part of a POST request, an arbitrary amount of data of any type can be sent to remote agent 157 in the body of the request message. A header field in the POST may indicate the message body's Internet media type.

The HTTP GET and POST commands may also be used for synchronizing files between virtual machine 155 and VDI client 110. That is, instead of a user manually copying and pasting files between virtual machine 155 and VDI client 110, automatic processes may be implemented that periodically synchronize files between the two entities. The automatic processes can utilize the HTTP commands as described herein to either POST or GET the files as needed to complete synchronization. The HTTP commands therefore provide functionality that is not present in current implementations of HTML-based view clients.

In some embodiments, media files stored at storage system 160 or retrieved via remote agent 157 may be played directly in a browser at VDI client 110. While the file transfer is in process and only partially complete, the browser can begin playing the file at VDI client 110. Media files that play in a client machine often play back more smoothly than media files that play in a remote server. Embodiments described herein allow media files to be transferred and played at the local machine even when the user is using an HTML-based view client.

Figure 2:
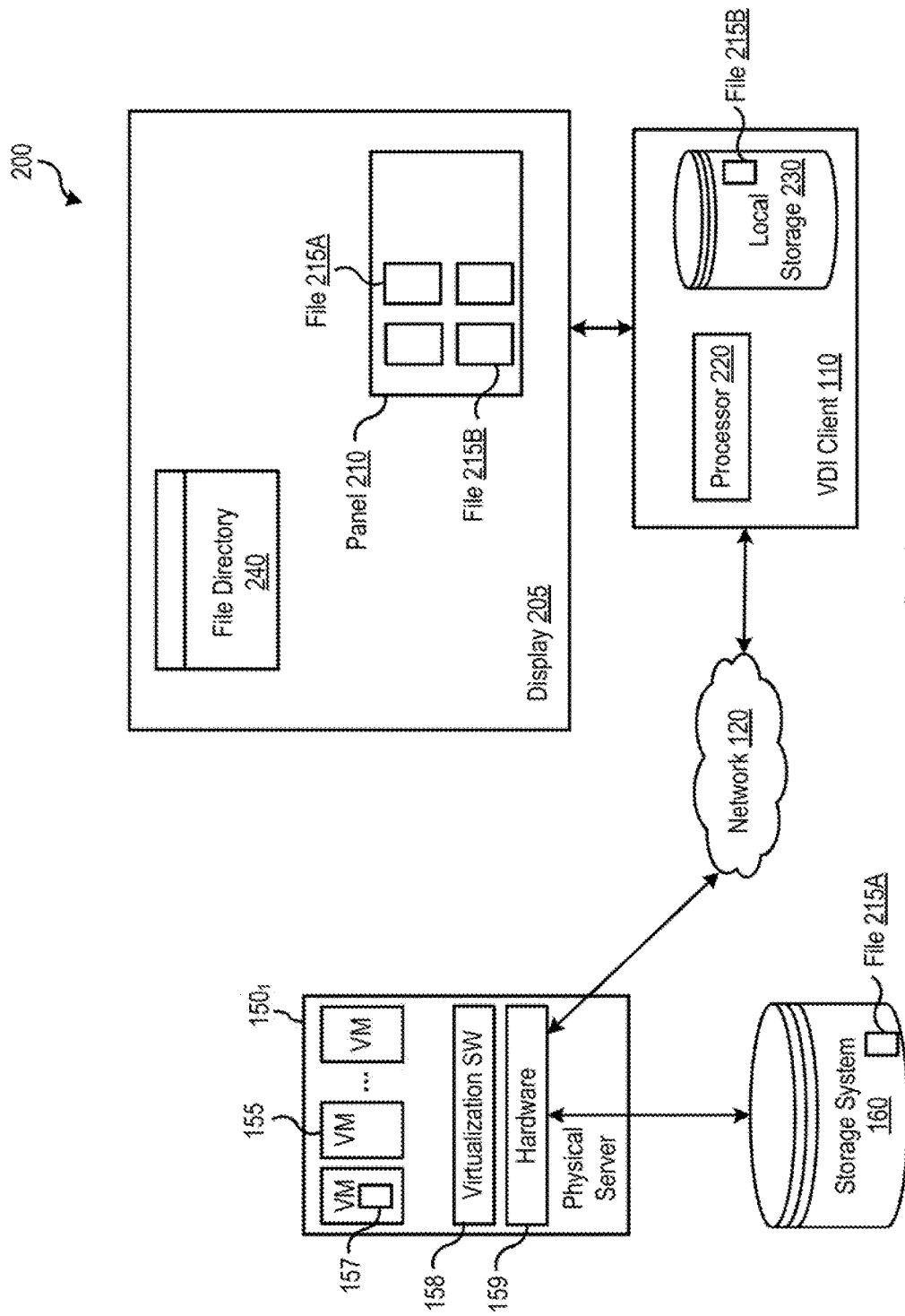
FIG. 2 illustrates an example portion of a system including a graphical user interface for a VDI client.

FIG. 2 illustrates an example portion 200 of a system including a graphical user interface for a VDI client 110. VDI client 110 includes a processor 220 and local storage 230 in this example. As noted above, users can access virtual desktops 155 or remote applications from a browser on any device, such as a laptop, thin client device, desktop personal computer, tablet, or phone. VDI client 110 also comprises a display 205. Illustrated on display 205 is a panel 210 that the user can use for copying files. Multiple icons that represent files 215 are illustrated on panel 210 as an example. The user can utilize panel 210 as a type of clipboard for dragging and dropping files 215. File directory 240 is also illustrated on display 205. File directory 240 operates like a standard file directory, and a user can use file directory 240 to view files stored locally on local storage 230 or stored remotely on storage system 160.

FIG. 2 also illustrates desktops running in virtual machines 155 which are instantiated on a physical computer 150 that includes virtualization software 158 and hardware 159 (CPU(s), memory, storage, etc.), and is coupled to a shared persistent storage system 160 and network 120. Virtual machine 155 includes a remote agent 157 as described above. VDI client 110 is coupled to physical computer 150 through network 120. For simplicity, other components illustrated in FIG. 1 are not shown in FIG. 2.

In one embodiment, a user logs into a remote desktop environment via a web browser. Embodiments described herein provide an HTML-based solution for transferring files from a VDI client to a remote agent, or vice versa. The user interacts with the remote agent 157 via display 205 and any hardware or input devices (keyboard, mouse, touchscreen, etc.) associated with VDI client 110. Display 205 displays a panel 210 that the user can use for copying files. In one embodiment, the user can drag and drop files 215 onto panel 210 to copy files from storage system 160 to local storage 230 or vice versa. As an example, the user can view files 215 stored on storage system 160 using file directory 240, and then drag one or more files 215 from file directory 240 into panel 210. This action copies the file to local storage 230. Files 215 are transferred to local storage 230 of VDI client 110 via the HTTP commands as described herein. In another embodiment, the user can drag files 215 from local storage 230 to panel 210 for transferring the files to storage system 160. The user can also download or upload multiple files at once with the use of panel 210.

As one example, file 215A is shown being stored in storage system 160. A user can use keyboard commands to copy and paste the file 215A to VDI client 110 according to embodiments described below. However, a user can also drag and drop file 215A to copy the file. The user can locate file 215A in file directory 240 and drag the file to panel 210. This action copies file 215A to local storage 230 via HTTP commands as described herein.

Similarly, file 215B is stored in local storage 230. A user can drag and drop file 215B to panel 210. This action copies file 215B to storage system 160 via HTTP commands as described herein.

Figure 3:
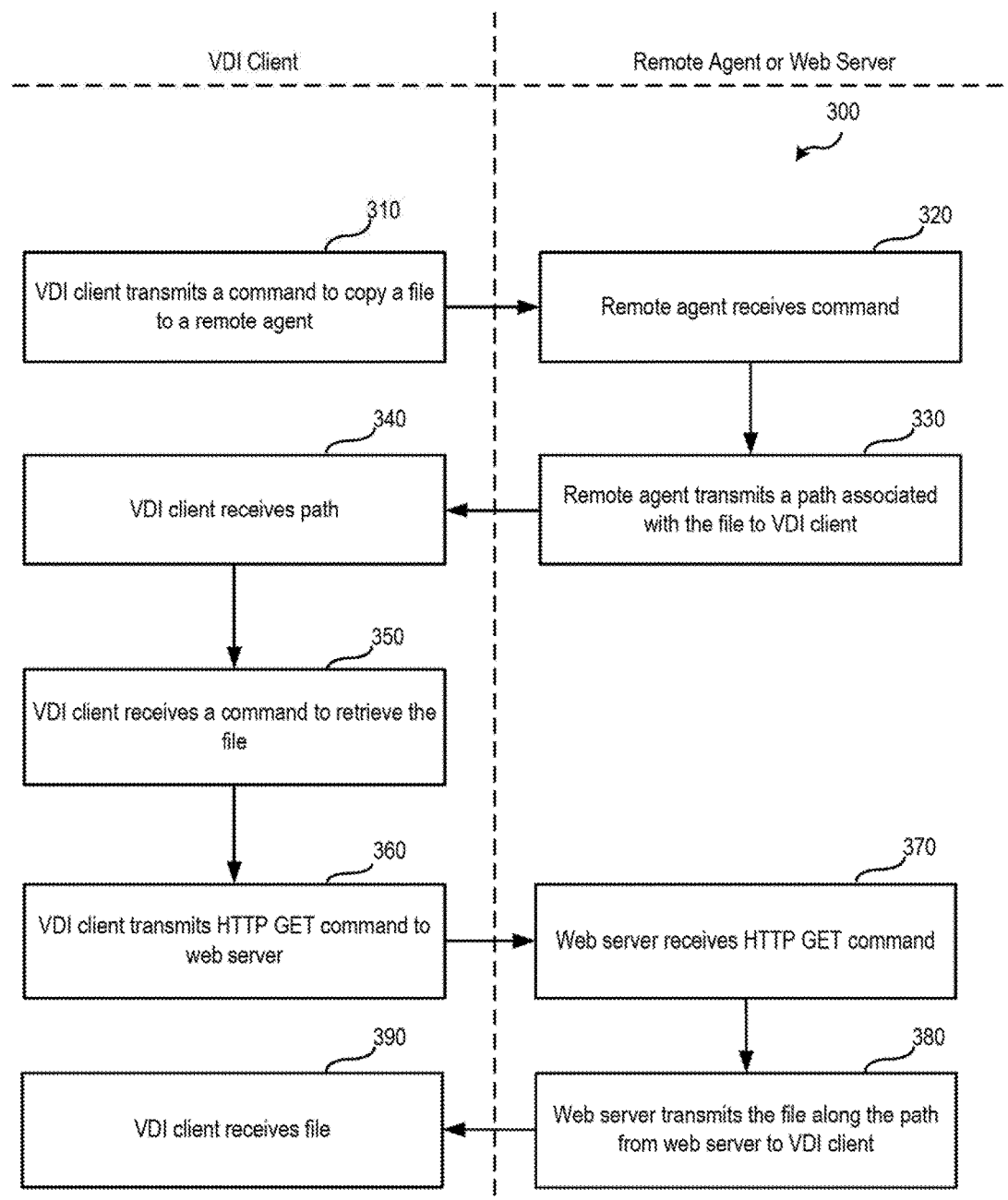
FIG. 3 is a flowchart illustrating a method for transferring a file in a virtualized computing environment, according to an embodiment.

FIG. 3 is a flow diagram that illustrates a method of transferring a file in a virtual computing environment. Although the method steps are described in conjunction with the systems of FIGS. 1-2, persons skilled in the art will understand that any system configured to perform the method steps falls within the scope of the present invention. In various embodiments, the hardware and/or software elements described above in FIGS. 1-2 can be configured to perform the method steps of FIG. 3.

In FIG. 3, steps taken by VDI client 110 or at VDI client 110 are shown on the left side of the figure. Steps taken at remote agent 157 or by remote agent 157 or the web server are shown on the right side of the figure. A method 300 begins at step 310 where a VDI client, such as VDI client 110, transmits a command to copy a file to a remote agent, such as remote agent 157. The command to copy the file may be input to VDI client 110 by a user. One example of a command to copy a file is a Control-C command entered by a user on a keyboard. The user selects a file stored in remote storage and then enters the keyboard command.

At step 320, remote agent 157 receives the command to copy the file. Upon receiving the command to copy the file, the method proceeds to step 330, where remote agent 157 transmits a path, used to identify a location of the file to a web server, to VDI client 110. This path can be transmitted to the VDI client 110 via a virtual channel between remote agent 157 and VDI client 110.

At step 340, VDI client 110 receives the path associated with the file from remote agent 157. At step 350, VDI client 110 receives an appropriate command from the user to retrieve the file, such as the keyboard command Control-V. This command instructs VDI client 110 that the user wants to retrieve the file and transfer (paste) the file to VDI client 110.

The method proceeds to step 360, where an HTTP command, such as the HTTP GET command, is transmitted from VDI client 110 to the web server to retrieve the file. The GET command includes the path of the file that the user wants to copy.

At step 370, the web server receives the GET command. The method proceeds to step 380, where the web server retrieves the file and transmits the file to VDI client 110. At step 390, VDI client 110 receives the file. The file is then stored in local storage at VDI client 110, and the user has successfully copied the file from the remote machine to the local machine.

Figure 4:
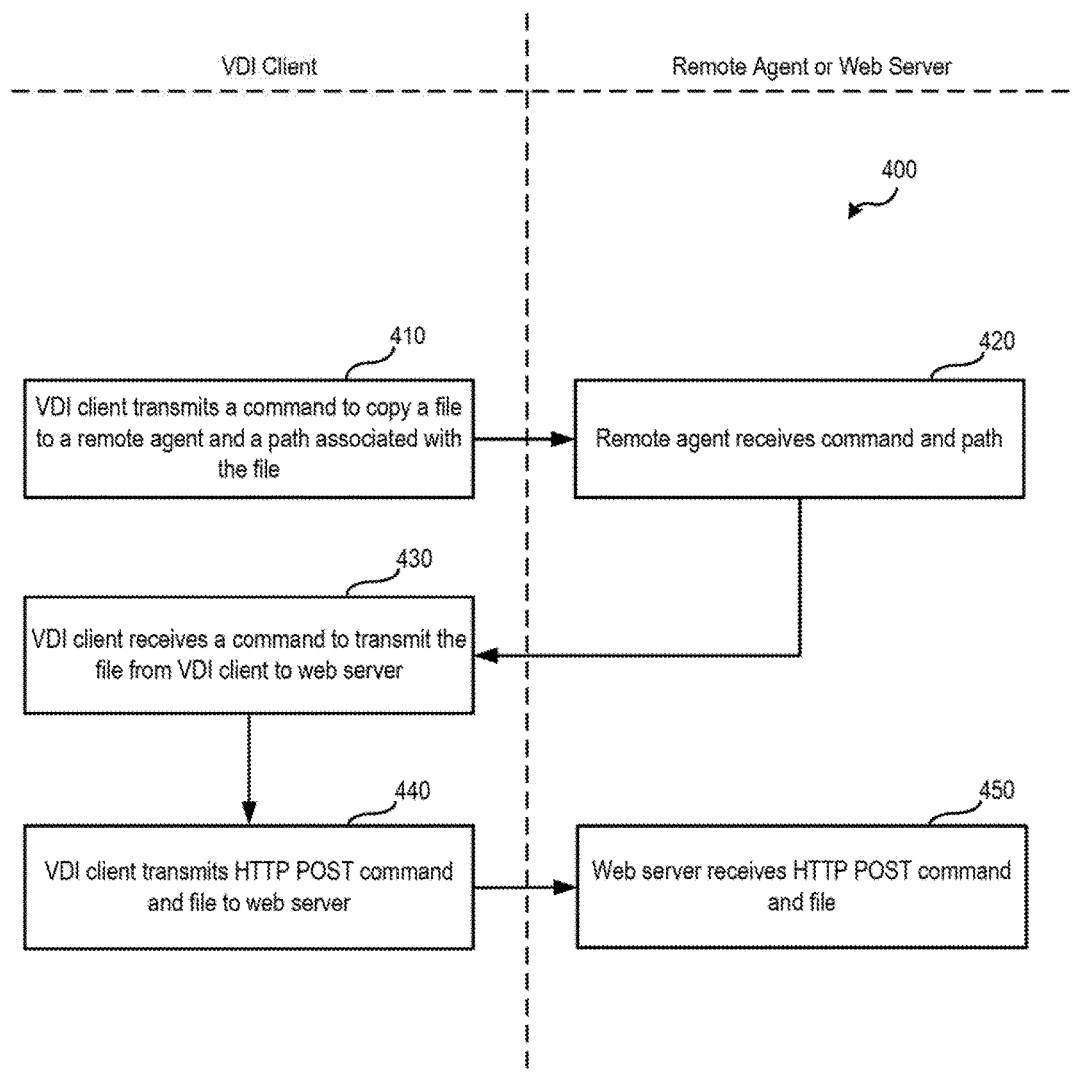
FIG. 4 is a flowchart illustrating a method for transferring a file in a virtualized computing environment, according to another embodiment.

FIG. 4 is a flow diagram that illustrates another method of transferring a file in a virtual computing environment. Although the method steps are described in conjunction with the systems of FIGS. 1-2, persons skilled in the art will understand that any system configured to perform the method steps falls within the scope of the present invention. In various embodiments, the hardware and/or software elements described above in FIGS. 1-2 can be configured to perform the method steps of FIG. 4.

In FIG. 4, steps taken by VDI client 110 or at VDI client 110 are shown on the left side of the figure. Steps taken at remote agent 157 or by remote agent 157 or by the web server are shown on the right side of the figure. As shown, a method 400 begins at step 410 where a VDI client 110 transmits a command to copy a file. In this example, a user wants to transfer a file from a local machine to remote agent 157. To accomplish this, the user may first select a file on the local machine and then input a command to copy the file. The command may be a keyboard command such as Control-C. When the user enters the command, VDI client 110 transmits the command to remote agent 157. The command is transmitted via a virtual channel in some embodiments. In addition, VDI client 110 transmits a path, used to identify the location of the file to the web server, to remote agent 157. The file is retrieved using this file path. In some embodiments, the command and the file path are transmitted from VDI client 110 to remote agent 157 via a virtual channel.

The method proceeds to step 420, where remote agent 157 receives the command to copy the file and the path associated with the file from VDI client 110. At step 430, VDI client 110 receives a command to transmit the file from the VDI client 110 to the web server. In one embodiment, the user enters a keyboard command, such as Control-V to paste the file to remote storage, such as storage system 160.

The method proceeds to step 440, where an HTTP POST command transmits the file along the path from VDI client 110 to the web server. At step 450, the web server receives the HTTP POST command and the file. The HTTP POST command instructs the web server to save the file in remote storage, such as storage system 160. The user has successfully copied and pasted the file from a local client to a remote machine via an HTML-based view client.

Advantageously, techniques disclosed herein permit users to copy and paste files between a remote agent and a local machine when using an HTML-based view client. Files can be transferred using HTTP commands in a manner that is relatively seamless to the user. The user can utilize known keyboards commands, such as Control-C for copy and Control-V for paste, to move files between a local machine and a remote agent.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method to transfer a file in a virtualized computing environment, comprising:
    transmitting via a virtual channel, from a virtual desktop client operating in a hypertext markup language (HTML) based browser application running on a client device to a remote virtual desktop agent running on a server, a command to copy a file in storage accessible by the remote virtual desktop agent;
    in response to transmitting the command to copy the file, receiving via the virtual channel, at the virtual desktop client, a path from the remote virtual desktop agent, wherein the path is used to identify a location of the file to a web server, wherein the virtual channel is between the virtual desktop client and the virtual desktop agent without the web server as an intermediary;
    receiving, at the virtual desktop client, a command to paste the file;
    in response to receiving the command to paste the file, transmitting, from the virtual desktop client, a hypertext transfer protocol (HTTP) command to the web server to retrieve the file; and
    in response to transmitting the HTTP command to retrieve the file, receiving, at the virtual desktop client, the file from the web server and not via the virtual channel.

2. The method of claim 1, wherein the HTTP command transmitted to the web server is an HTTP GET command.

3. The method of claim 1, wherein the virtual desktop client receives the file directly from a directory associated with the file.

4. The method of claim 1, wherein the file comprises a media file, and the virtual desktop client plays the media file.

5. The method of claim 1, wherein the command to copy the file is received at the virtual desktop client via user interaction with a graphical user interface displayed on the client device.

6. The method of claim 1, further comprising:
    transmitting via the virtual channel, from the virtual desktop client to the remote virtual desktop agent, a second command to copy a second file;
    transmitting via the virtual channel, from the virtual desktop client to the remote virtual desktop agent, a second path used to identify a second location of the second file to the web server;
    receiving, at the virtual desktop client, a command to paste the second file from the client device to the web server; and
    in response to receiving the command to paste the second file, retrieving the second file and transmitting the second file from the client device to the web server using a second HTTP command indicating the second path.

7. The method of claim 6, wherein the second HTTP command comprises a POST command.

8. A method to transfer a file in a virtualized computing environment, comprising:
    receiving via a virtual channel, at a remote virtual desktop agent running on a server, a command from a virtual desktop client operating in a hypertext markup language (HTML) based browser application running on a client device to copy a file stored in storage accessible by the remote virtual desktop agent;
    in response to receiving the command to copy the file, transmitting, via the virtual channel, a path used to identify the location of the file to a web server from the remote virtual desktop agent to the virtual desktop client, wherein the virtual channel is between the virtual desktop client and the virtual desktop agent without the web server as an intermediary;
    receiving a hypertext transfer protocol (HTTP) command at the web server from the virtual desktop client, wherein the HTTP command is a command to paste the file; and
    in response to receiving the HTTP command to paste the file, transmitting the file from the web server to the virtual desktop client and not via the virtual channel.

9. The method of claim 8, wherein the HTTP command is an HTTP GET command.

10. The method of claim 8, wherein the web server retrieves the file directly from a directory associated with the file.

11. The method of claim 8, wherein the command to copy the file is received at the virtual desktop client via user interaction with a graphical user interface displayed on the client device.

12. A non-transitory computer-readable storage medium containing a program which, when executed by one or more processors, performs operations for transferring a file in a computerized virtual environment, the operations comprising:
    transmitting via a virtual channel, from a virtual desktop client operating in a hypertext markup language (HTML) based browser application running on a client device to a remote virtual desktop agent running on a server, a command to copy a file in storage accessible by the remote virtual desktop agent;
    in response to transmitting the command to copy the file, receiving via the virtual channel, at the virtual desktop client, a path from the remote virtual desktop agent, wherein the path is used to identify a location of the file to a web server, wherein the virtual channel is between the virtual desktop client and the virtual desktop agent without the web server as an intermediary;
    receiving, at the virtual desktop client, a command to paste the file;
    in response to receiving the command to paste the file, transmitting, from the virtual desktop client, a hypertext transfer protocol (HTTP) command to the web server to retrieve the file; and in response to transmitting the HTTP command to retrieve the file, receiving, at the virtual desktop client, the file from the web server and not via the virtual channel.

13. The computer-readable storage medium of claim 12, wherein the HTTP command transmitted to the web server is an HTTP GET command.

14. The computer-readable storage medium of claim 12, wherein the virtual desktop client receives the file directly from a directory associated with the file.

15. The computer-readable storage medium of claim 12, wherein the file comprises a media file, and the virtual desktop client plays the media file.

16. The computer-readable storage medium of claim 12, wherein the command to copy the file is received at the virtual desktop client via user interaction with a graphical user interface displayed on the client device.

17. The computer-readable storage medium of claim 12, further comprising:
  transmitting via the virtual channel, from the virtual desktop client to the remote virtual desktop agent, a second command to copy a second file;
  transmitting via the virtual channel, from the virtual desktop client to the remote virtual desktop agent, a second path used to identify a second location of the second file to the web server;
  receiving, at the virtual desktop client, a command to paste the second file from the client device to the web server; and
  in response to receiving the command to paste the second file, retrieving the second file and transmitting the second file from the client device to the web server using a second HTTP command indicating the second path.

18. The computer-readable storage medium of claim 12, wherein the second HTTP command comprises a POST command.

19. A non-transitory computer-readable storage medium containing a program which, when executed by one or more processors, performs operations for transferring a file in a computerized virtual environment, the operations comprising:
  receiving via a virtual channel, at a remote virtual desktop agent running on a server, a command from a virtual desktop client operating in a hypertext markup language (HTML) based browser application running on a client device to copy a file stored at the remote agent;
  in response to receiving the command to copy the file, transmitting, via the virtual channel, a path used to identify the location of the file to a web server from the remote virtual desktop agent to the client device;
  receiving a hypertext transfer protocol (HTTP) command at the remote virtual desktop agent from the client device, wherein the HTTP command is a command to paste the file; and
  in response to receiving the HTTP command to paste the file, transmitting the file along the path from the web server to the client device via HTTP.

20. The computer-readable storage medium of claim 19, wherein the HTTP command is an HTTP GET command.

21. The computer-readable storage medium of claim 19, wherein the web server retrieves the file directly from a directory associated with the file.

22. The computer-readable storage medium of claim 19, wherein the command to copy the file is received at the virtual desktop client via user interaction with on a graphical user interface displayed on the client device.

\* \* \* \* \*